United States Patent [19]

Jackson

[11] 3,715,270
[45] Feb. 6, 1973

[54] NUCLEAR REACTORS

[75] Inventor: George Oliver Jackson, Timperley, England

[73] Assignee: United Kingdom Atomic Energy Authority, London, England

[22] Filed: Jan. 13, 1969

[21] Appl. No.: 790,779

[30] Foreign Application Priority Data

Jan. 30, 1968 Great Britain..................4,847/68
Feb. 21, 1968 Great Britain..................8,535/68

[52] U.S. Cl. .....................176/38, 176/40, 176/65
[51] Int. Cl............................G21c 9/00, G21c 15/00
[58] Field of Search............176/65, 87, 64, 17, 18, 38

[56] References Cited

UNITED STATES PATENTS

| | | | |
|---|---|---|---|
| 2,961,393 | 11/1960 | Monson | 176/18 |
| 3,080,308 | 3/1963 | Dickinson | 176/65 X |
| 3,139,384 | 6/1964 | Filloleau et al. | 176/64 X |
| 3,169,117 | 2/1965 | Dickinson et al. | 176/87 UX |
| 3,296,085 | 1/1967 | Peck et al. | 176/87 X |
| 3,486,973 | 12/1969 | Georges et al. | 176/64 X |
| 3,498,880 | 3/1970 | Henri-Jacques Gollion | 176/65 X |

*Primary Examiner*—Benjamin R. Padgett
*Assistant Examiner*—E. E. Lehmann
*Attorney*—Larson, Taylor & Hinds

[57] ABSTRACT

A large power-producing nuclear reactor of the liquid metal cooled fast breeder type with its coolant circuitry submerged in a liquid metal pool in a vault, has an enclosed core and coolant circuit loops communicating with the core enclosure at opposed ends, the core enclosure also containing radial neutron shielding and one end neutron shielding and being constituted by an open-topped vessel whose top is closed by a lid which incorporates a part of neutron shielding for the other end, the remaining part of said other end neutron shielding being constituted by the vault roof or a part thereof. The vessel lid is preferably connected to a co-axial rotatable part of said vault roof for rotation and outward axial movement therewith. The reactor tank preferably has a minimum width in the region where the core is disposed so as to provide hold-down structure with minimum span.

6 Claims, 5 Drawing Figures

NUCLEAR REACTORS

BACKGROUND OF THE INVENTION

This invention relates to liquid metal cooled fast breeder nuclear reactors for power production.

It is thought that large reactors of the above type cannot rely on merely a simple scaling-up of the dimensions of a pilot or small prototype reactor, since problems which exist for the smaller reactors but which may be of an order which is acceptable for them may well be multiplied so as to be unacceptable for the larger size. For example, in a prototype sodium cooled fast breeder reactor where the coolant circuit is submerged in a tank of sodium, there is likely to be a variation of sodium level in the tank and a problem of gas entrainment from the gas blanket topping the sodium in the tank. However, it is thought that both these problems will be insufficient to have any significant effect on successful operation whereas, in the case of a large power producing reactor such as a 1300 MW(e) reactor, it is necessary to design so as to eliminate the causes of these phenomena.

It is an object of the present invention to provide a design which is optimized for large power-producing reactors of the said type.

SUMMARY OF THE INVENTION

According to the invention, a large power-producing nuclear reactor of the type comprising a liquid metal cooled fast breeder reactor having its coolant circuitry submerged in a liquid metal pool in a tank disposed in a vault, has its core enclosed, has said core and radial and lower end neutron shields contained in an open-topped vessel, the top of said vessel being closed by a lid incorporating a portion of the upper end neutron shielding, the remaining portion of said upper end neutron shielding being constituted by a roof of said vault, and has a plurality of coolant circuit loops each comprising outflow ducting penetrating said vessel at the upper end region thereof, inflow ducting penetrating said vessel at the lower end thereof, and heat exchange means and liquid metal circulating means in circuit between said outflow and inflow ducts. The expression 'core' is to be understood to include breeder regions whether axial or radial or both.

The said vault roof preferably includes at least one part which is rotatable relative to said core, the or one of said parts being co-axial with the reactor core, and said vessel lid is connected to the co-axial roof part for rotation therewith. In consequence, and also because of differential expansion, there will be imperfect sealing between the vessel and its lid, but it is thought that the leakage rate can be made tolerable, particularly when scavaging, as referred to hereafter, is provided. There may also be leakage at the inlet end of the core vessel, and said leakage may be directed to flow over the outlet region of said vessel to scavange and reduce the amount of pool coolant joining the outflow coolant due to said imperfect sealing between the vessel and its lid.

Said vessel lid is conveniently employed not only to constitute a part of said upper end neutron shielding but also to support equipment and instrumentation necessarily associated with the reactor core, such as control rod mechanism, sample pipes for coolant for monitoring for failed fuel elements, thermocouples for core coolant outflow temperature monitoring, etc.

The said co-axial vault roof part and the vessel lid connected thereto are preferably together movable outwardly relative to said reactor core, whereby monitoring equipment associated with said vessel lid can be withdrawn from the reactor core to enable refuelling of the core to be effected with the aid of the rotatable vault roof part or parts.

Because the vessel lid and the vault roof part connected thereto will be subjected to a considerable upward force by the upward flowing coolant from the core, and because these connected parts must also be able to withstand, so as to provide continued containment, the considerable outward force of any excursion of explosive violence within the reactor tank, it is preferable to construct the reactor tank so as to have a minimum width in the region thereof wherein the core is disposed, so that hold-down structure for said vault roof or part thereof can be of minimum span. Suitable cross-sectional shapes for said reactor tank are oval, elliptical, or rectangular with rounded corners.

DESCRIPTION OF THE DRAWINGS

Constructional examples embodying the invention are illustrated in the accompanying diagrammatic drawings, wherein.

DESCRIPTION OF THE PREFERRED EMBODIMENTS

Figure 1:
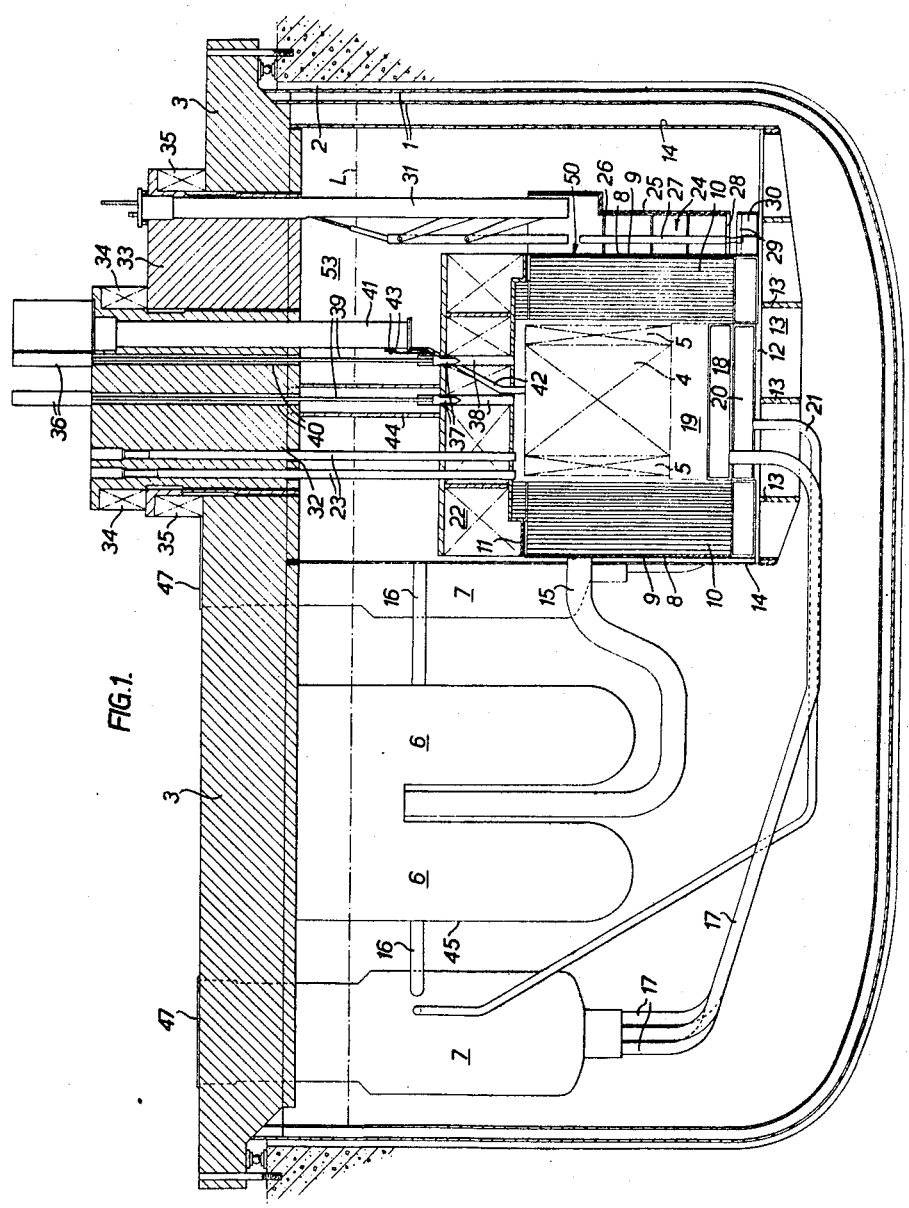
FIG. 1 is a side view partly in medial section, illustrating one construction of a large power producing nuclear reactor of the liquid metal cooled fast breeder type.
Figure 2:
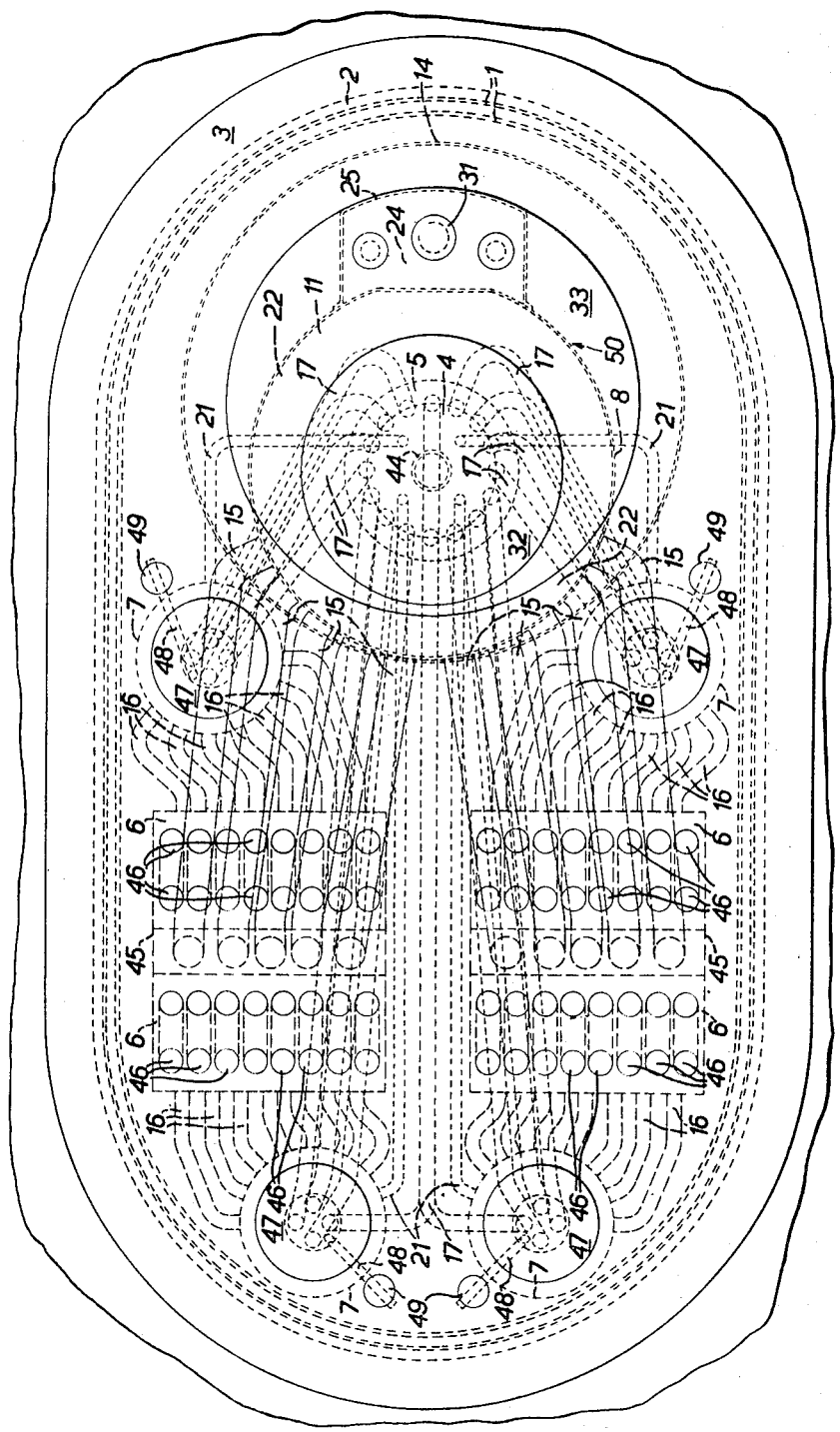
FIG. 2 is a plan view of FIG. 1.

The nuclear reactor illustrated in FIGS. 1 and 2 of the drawings is designed for an electrical output of 1300 MW and is of the sodium-cooled, fast breeder type. Briefly it comprises a double-walled primary tank 1 contained in a vault 2 and closed by a roof 3 supported across the vault opening. The tank 1 contains sodium up to a level L (FIG. 1). It also contains, submerged in the sodium, the whole primary coolant circuit of the reactor, consisting of the reactor core 4 (which includes axial breeder regions at either end and radial breeder region 5), four primary heat exchanger sections 6, four pumps 7, and ducting connecting these items in a closed circuit which will be described subsequently. To accommodate these items, the reactor vessel is rectangular with rounded ends in plan view (FIG. 2) and has a rounded bottom, with approximate dimensions 82 ft. long, 43½ ft. wide and 48 ft. deep. The core and its appurtenances are at one side of the tank (the right hand side in FIG. 1), with the heat exchangers and two pumps at the opposite side, the other two pumps being more or less central and occupying room provided by the generally cylindrical shape (in plan) of the core and appurtenances (see FIG. 2).

The reactor core, including the radial breeder region, is enclosed by a vessel 50 consisting of a cylindrical side wall 8 with thermal insulation 9 and shielding 10 on its inner surface, an upper end cover or lid 11 fitting loosely on the wall 8, and a core lower end enclosure consisting of a platform 12 supported by beams 13 suspended by hangers or, as shown, a cylinder 14 from the vault roof 3. Ducts 15 penetrate the side wall 8 and cylinder 14 at a number of radial positions at about ⅔ core height, these positions being indicated in FIG. 2. The ducts 15 lead to the primary heat exchangers 6, and hot sodium which has passed through the fuel and breeder regions is led to the ducts 15 by the restraint offered by the lid 11 and by suitable baffling (not shown) at the upper end of the shielding 10. After exchanging heat, the sodium is led from the primary heat-exchangers to the inlets of the pumps 7 by a plurality of ducts 16. The delivery of the sodium by the pumps 7 is conducted by ducts 17 to the lower end of the core for passage therethrough in an upward direction.

A diagrid 18 is carried by the platform 12 and the ducts 17 extend through the platform 12 and terminate at the inlet ends of fuel element support tubes (not shown, but accommodated in the volume 19, FIG. 1) which are carried by the diagrid 18, the sodium passing through the support tubes and into fuel element sub-assemblies for passage over the fuel pins therein. A collecting tank 20 is situated beneath the diagrid and serves to collect any leakage or flow-back of sodium from the ends of the ducts 17. The collecting tank communicates with a duct 21 which leads back to the inlet of one or more of the pumps 7 so that sodium reaching the tank 20 is drawn back to the respective pump or pumps for rejoining the main flow.

Alternatively (not shown), the duct 21 can be taken up to the upper end of the core in order to scavange cool sodium from the sodium pool in the tank which may otherwise be able, by leakage or clearance at the lid 11, to join the hot sodium from the core and degrade its temperature. The scavange flow will be returned by suitable ducting to the inlet of one or more pumps 7.

Supported by and forming part of the lid 11 is a neutron shield 22 penetrated by access tubes for performing various operations, including control, fuel handling and monitoring, on the fuel and breeder regions of the core. Thus two access tubes 23 serve for transferring fuel element sub-assemblies between the core and a fuel store 24 disposed at the side of the core outside the core enclosure 50 but within a part-enclosure 25 of its own which is provided with thermal insulation 26 and open at its upper and lower ends to provide for a convection flow of coolant over fuel element sub-assemblies stored therein (one is illustrated in FIG. 1 and designated 27) from the main sodium pool in the tank 1. The fuel sub-assemblies are supported in the fuel store by grids 28, 29 and provision is made (not shown, but provided in the volume 30) for absorbing the energy of impact should a fuel element sub-assembly be inadvertently dropped into the fuel store from a refuelling machine 31 which operates on the winch and lazy tongs principle and serves for loading new fuel element sub-assemblies into and removing irradiated fuel element sub-assemblies from the fuel store 24. A flask (not shown) for shielding and cooling irradiated fuel element sub-assemblies can be positioned over the refuelling machine 31 and be removed therefrom when loaded and transported to remotely disposed fuel handling facilities. The access tubes 23 have fuel element sub-assembly transfer machines (not shown) removably provided at their upper ends for performing fuel transfer operations between core (including breeder region) and fuel store 24. In order to achieve universality of positioning, the access tubes 23 are provided in apertures in an inner rotating shield 32 which has its axis of rotation coaxial with the core axis. The inner shield 32 is eccentrically provided in an outer rotating shield 33 whose axis is eccentric relative to the core axis. There is provision (shown diagrammatically in FIG. 1 and designated 34, 35) for mounting and performing rotation of the shields 32, 33 respectively, the outer shield 33 being mounted in the roof 3. Furthermore, there is also provision (not shown) for jacking up the inner shield 32 relative to the outer shield 33 for a purpose which will become apparent hereafter. The refuelling machine 31 is mounted in the outer shield 33 and can serve the various positions in the fuel store 24 by rotation of the outer shield 33.

The inner shield 32 also serves for carrying equipment 36 for operating control elements 37 provided in control access tubes 38 mounted in the neutron shield 22, the elements 37 being connected to the equipment 36 by suspensions 39 accommodated in tubes 40 penetrating the inner shield 32. Furthermore, the inner shield 32 carries equipment 41 for monitoring samples of coolant extracted from the outflowing coolant from each fuel element sub-assembly in the core or a group thereof. A single sample pipe is illustrated for the sake of clarity and is designated 42. It will be noted that this sample pipe 42 is convergent from core to monitor and that the pipe 42 penetrates slightly into the core region; this is to ensure that the sample is collected from just inside the wrapper of a fuel sub-assembly or from a joint outlet from a group of sub-assemblies, whichever system is chosen. Thus the sample will be truly representative of that sub-assembly or group of sub-assemblies alone. The pipe 42 also serves for guiding thermocouple cables from the sub-assembly or group thereof; a pair of such cables is illustrated at 43 and they will extend (not shown) upwardly through the shield 32 to suitable indicating and recording equipment in the reactor control room or intermediately.

The lid 11 and the neutron shield 22 integral therewith are secured to the shield 32 by a hollow pillar 44 so that the combined neutron shield 22 and lid 11 rotates and is lifted with the inner shield 32. It will be appreciated from the foregoing that the assembly consisting of the shield 32, combined neutron shield 22 and lid 11, and the sample pipes 42 which are mounted in the shield 22, penetrate the lid 11 and extend into the core in their normal positions, must be lifted in order to free the assembly for rotation relative to the core, which of course is fixed. A lift of about 4 inches for the relative dimensions shown in the drawings will suffice. Thus for fuel transfer operations, the said lift must precede any rotation of the inner shield 32 (and also of course any rotation of the outer shield 33 since the shield 32 is mounted eccentrically therein), and in addition, control elements 37 must be withdrawn from the core. Provision is made (not shown) for ensuring that shut down elements can be inserted in the core during refuelling operations should any occurrence require this; suitable equipment has the feature of non-association with any of the rotatable elements aforesaid. Thus, if considered desirable, the reactor is capable of being operated so as to be refuellable on load.

The heat exchangers 6 are of the U-tube type which necessitates only a single header at the upper end of the tubes. Sodium is employed as the secondary fluid, the secondary sodium being taken from the headers out of the vessel 1 by ducts (not shown) to secondary heat exchangers for steam raising for turbines for power generation. Two heat exchanger sections 6 are contained in each of two vessels 45, the flow of primary sodium being outwardly from a central bank of inlets constituted by the ends of the ducts 15, over the tubes 46, through which flows the secondary sodium, and out to the inlets of the pumps 7 via the ducts 16.

The pumps 7 are accessible for maintenance through shielded manholes 47 in the roof 3. They are of the axial flow impeller type and are driven electrically employing station output but provided with stand-by auxiliary motors driven from a guaranteed emergency supply of electricity. They also incorporate fly-wheels to give a run-down capacity to enable switching-over to emergency supplies to be done with the minimum interference with sodium circulation. One outlet duct 48 (FIG. 2) from each pump has a valve 49 and communicates directly with the sodium pool in the vessel 1; this is to give a measure of interchangeability of sodium between the primary circuit, which is entirely enclosed apart from the leakages and scavange flow previously referred to, and the sodium pool. The amount of interchangeability can be regulated by the valve 49, which is operable remotely.

The space between the roof 3 and the sodium level L is occupied by an inert gas (e.g. argon) blanket 53 which is kept at slightly less than atmospheric pressure whereby any leakage will be inwardly. Clearances, for example those between shields 32 and 33 and between shield 33 and roof 3, are protected by dip seals and an inert gas purge of the interspace between dip seals with slight overpressure bringing about bubbling of the purge gas inwardly through the lower dip seal.

Figure 3:
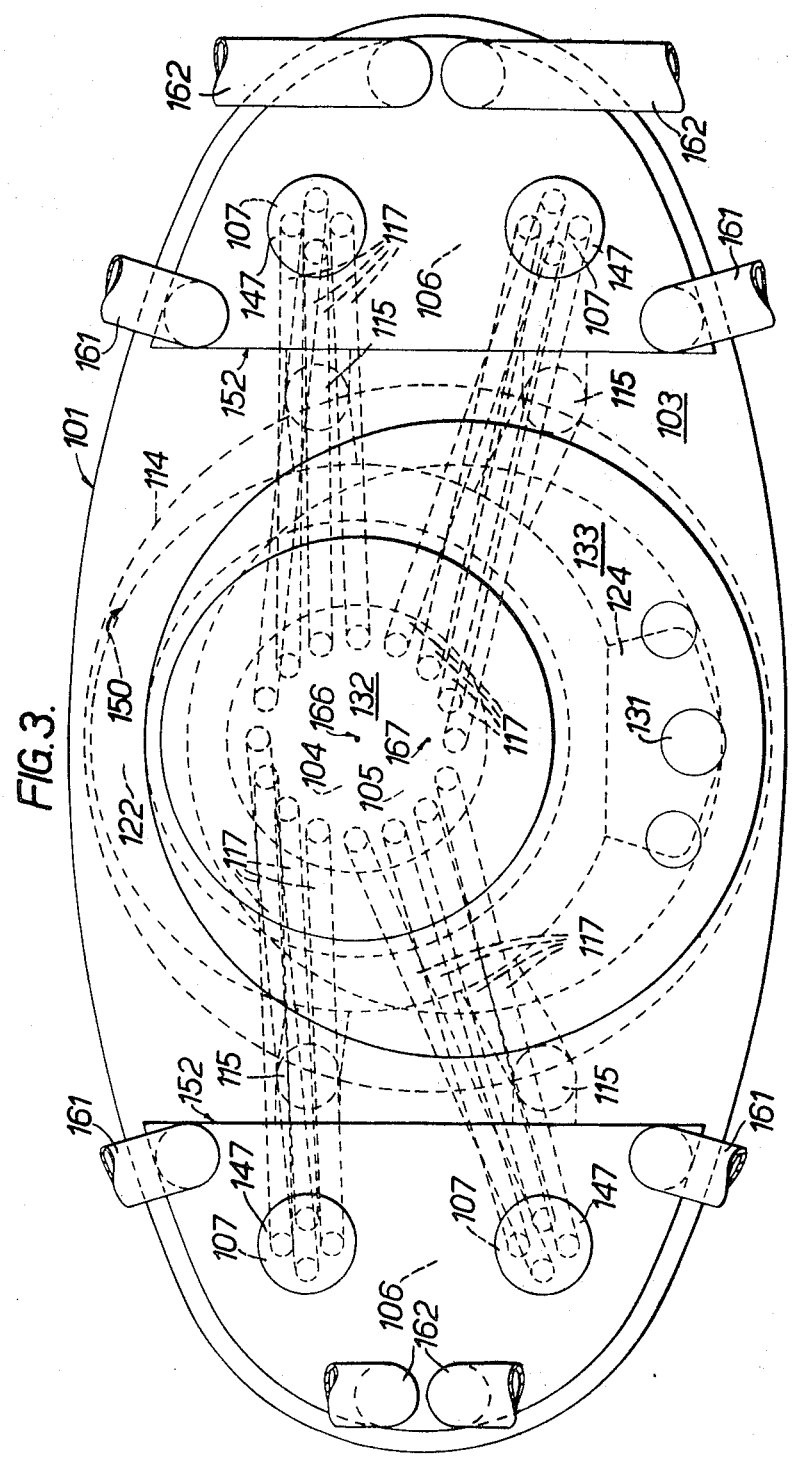
FIG. 3 is plan view of another construction of a large power-producing nuclear reactor of the liquid metal cooled fast breeder type.
Figure 4:
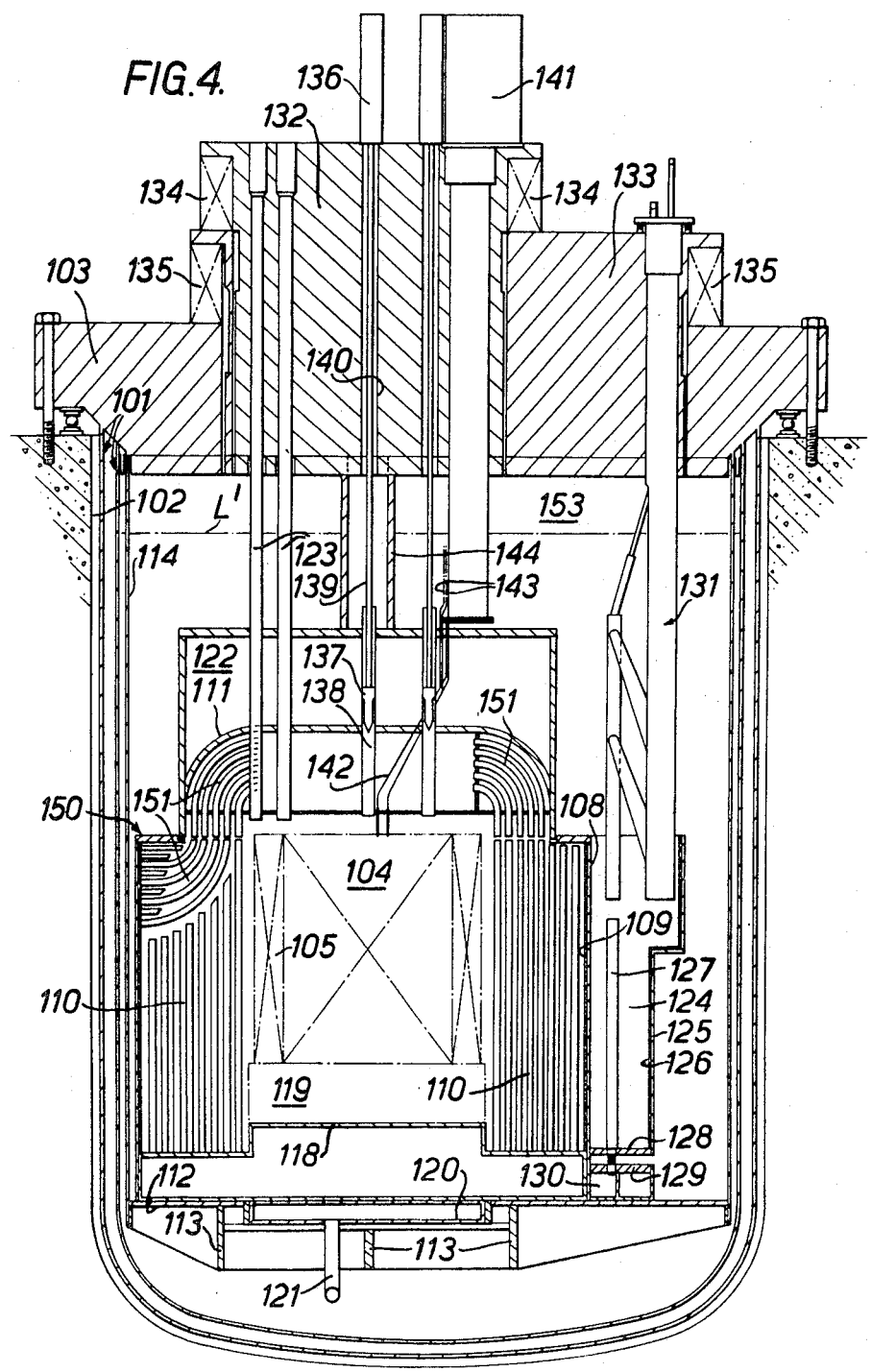
FIG. 4 is a section on the minor plane through the reactor tank shown in FIG. 3.
Figure 5:
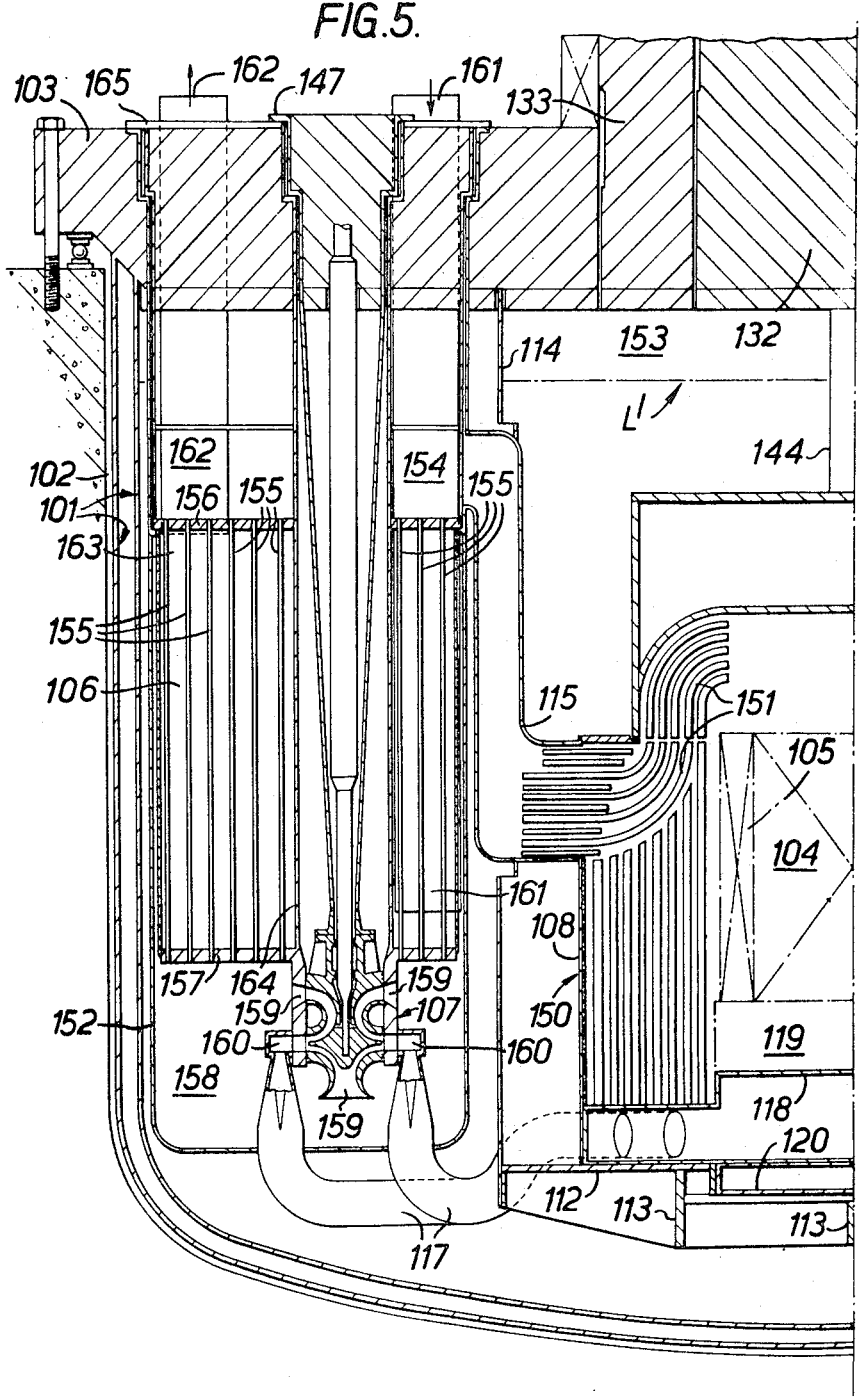
FIG. 5 is a fragmentary half-section on the major plane through the tank shown in FIG. 3, the non-illustrated half being generally a mirror image of the illustrated half.

Referring now to FIGS. 3-5 of the drawings, it is firstly observed that there are a number of similarities between the embodiment now to be described and the embodiment hereinbefore described; related reference numerals (plus 100) are applied to such similar parts. The construction of the nuclear reactor illustrated in FIGS. 3-5 is also designed for an electrical output of 1300 MW and is also of the sodium-cooled, fast breeder type. Briefly it comprises a double-walled primary tank 101 contained in a vault 102 and closed by a roof 103 supported across the vault opening. The tank 101 contains sodium up to a level L' (FIGS. 4 and 5). It also contains, submerged in the sodium, the whole primary coolant circuit of the reactor, consisting of the reactor core 104 (which includes axial breeder regions at either end and radial breeder region 105), four primary heat exchanger sections 106 split between two vessels 152 (FIGS. 3 and 5), four pumps 107, and ducting connecting these items which will be described subsequently. To accommodate these items, the reactor tank 101 is elliptical (FIG. 3) and has a rounded bottom, with approximate dimensions 64½ ft. long, 33 ft. wide and 45 ft. deep. The core and its appurtenances are in the center of the major diameter of the tank 101 but offset from the center of the minor diameter (see FIG. 3), with two heat exchanger sections and two pumps at either side of the core section.

The reactor core 104, including the radial breeder region 105, is enclosed by a vessel 150 consisting of a cylindrical side wall 108 with thermal insulation 109 and shielding 110 on its inner surface, an upper end cover or lid 111 fitting on the wall 108, and a core lower end enclosure consisting of a platform 112 supported by beams 113 suspended by hangers or, as shown, a cylinder 114 from the vault roof 103. Ducts 115 penetrate the side wall 108 and cylinder 114 at four radial positions opposite the upper half of the core, these positions being indicated in FIGS. 3 and 5. The ducts 115 lead to the primary heat exchangers 106, and hot sodium which has passed through the fuel and breeder regions is led to the ducts 115 by the constraint offered by the lid 111 and by suitable baffling 151 (FIGS. 4 and 5) at the upper end of the shielding 110. After exchanging heat, the sodium passes from the primary heat exchangers to the inlets of those of the pumps 107 which are contained in the same vessel 152 as the corresponding heat exchanger sections. The delivery of the sodium by the pumps 107 is conducted by ducts 117 to the lower end of the core for passage therethrough in an upward direction.

A diagrid 118 is carried by the platform 112 and the ducts 117 extend through the platform 112 and terminate at the inlet ends of fuel element support tubes (not shown, but accommodated in the volume 119, FIGS. 4 and 5) which are carried by the diagrid 118, the sodium passing through the support tubes and into fuel element sub-assemblies for passage over the fuel pins therein. A collecting tank 120 is situated beneath the diagrid and serves to collect any leakage or flow-back of sodium from the ends of the ducts 117. The collecting tank 120 communicates with a duct 121 which leads back (not shown) to the inlet of one or more of the pumps 107 so that sodium reaching the tank 120 is drawn back to the respective pump or pumps for rejoining the main flow.

Alternatively (not shown), the duct 121 can be taken up to the upper end of the core in order to scavange cool sodium from the sodium pool in the tank which may otherwise be able, by leakage or clearance at the lid 111, to join the hot sodium from the core and degrade its temperature. The scavange flow will be returned by suitable ducting to the inlet of one or more pumps 107.

Supported by the lid 111 and forming part of it is a neutron shield 122 penetrated by access tubes for performing various operations, including control, fuel handling and monitoring, on the fuel and breeder regions of the core. Thus two access tubes 123 (FIG. 4) serve for transferring fuel element sub-assemblies between the core and a fuel store 124 disposed at the side of the core outside the core enclosure 150 but within a part-enclosure 125 of its own which is provided with thermal insulation 126 and open at its upper and lower ends to provide for a convection flow of coolant over fuel element sub-assemblies stored therein (one is illustrated in FIG. 4 and designated 127) from the main sodium pool in the tank 101. The fuel sub-assemblies are supported in the fuel store by grids 128, 129, and provision is made (not shown, but provided in the volume 130) for absorbing the energy of impact should a fuel element sub-assembly be inadvertently dropped into the fuel store from a refuelling machine 131 which operates on the winch and lazy tongs principle and serves for loading new fuel element sub-assemblies into and removing irradiated fuel element sub-assemblies from the fuel store 124. A flask (not shown) for shielding and cooling irradiated fuel element sub-assemblies can be positioned over the refuelling machine 131 and be removed therefrom when loaded and transported to remotely disposed fuel handling facilities. The access tubes 123 have fuel element sub-assembly transfer machines (not shown) removably provided at their upper ends for performing fuel transfer operations between core (including breeder region) and fuel store 124. In order to achieve universality of positioning, the access tubes 123 are provided in apertures in an inner rotating shield 132 which has its axis of rotation coaxial with the core axis. The fuel transfer machines are carried by the shield 132. The inner shield 132 is eccentrically provided in an outer rotating shield 133 whose axis is eccentric relative to the core axis. There is provision (shown diagrammatically in FIG. 4 and designated 134, 135) for mounting and performing rotation of the shields 132, 133 respectively, the outer shield 133 being mounted in the roof 103. Furthermore, there is also provision (not shown) for jacking up the inner shield 132 relative to the outer shield 133 for a purpose which will become apparent hereafter. The refuelling machine 131 is mounted in the outer shield 133 and can serve the various positions in the fuel store 124 by rotation of the outer shield 133.

The inner shield 132 also serves for carrying equipment 136 for operating control elements 137 provided in control access tubes 138 mounted in the neutron shield 122, the elements 137 being connected to the equipment 136 by suspensions 139 accommodated in tubes 140 penetrating the inner shield 132. Furthermore, the inner shield 132 carries equipment 141 for monitoring samples of coolant extracted from the outflowing coolant from each fuel element sub-assembly in the core or a group thereof. A single sample pipe is illustrated for the sake of clarity and is designated 142. It will be noted that this sample pipe 142 is convergent from core to monitor and that the pipe 142 penetrates slightly into the core region; this is to ensure that the sample is collected from just inside the wrapper of a fuel sub-assembly or from a joint outlet from a group of sub-assemblies, whichever system is chosen. Thus the sample will be truly representative of that sub-assembly or group of sub-assemblies alone. The pipe 142 also serves for guiding thermocouple cables from the sub-assembly or group thereof; a pair of such cables is illustrated at 143 and they will extend (not shown) upwardly through the shield 132 to suitable indicating and recording equipment in the reactor control room or intermediately.

The combined neutron shield 122 and lid 111 is secured to the shield 132 by a hollow pillar 144 so that the combined neutron shield 122 and lid 111 rotates and is lifted with the inner shield 132. It will be appreciated from the foregoing that the assembly consisting of the shield 132, combined neutron shield 122 and lid 111, and the sample pipes 142 which are mounted in the shield 122, penetrate the lid 111 and extend into the core in their normal positions, must be lifted in order to free the assembly for rotation relative to the core, which of course is fixed. A lift of about 4 inches for the relative dimensions shown in the drawings will suffice. Thus for fuel transfer operations, the said lift must precede any rotation of the inner shield 132 (and also of course any rotation of the outer shield 133 since the shield 132 is mounted eccentrically therein), and in addition, control elements 137 must be withdrawn from the core. Provision is made (not shown) for ensuring that shut down elements can be inserted in the core during refuelling operations should any occurrence require this; suitable equipment has the feature of non-association with any of the rotatable elements aforesaid. Thus, if considered desirable, the reactor is capable of being operated so as to be refuellable on load.

It will be furthermore appreciated that because the lid 111 constrains coolant which has passed through the core 104, 105 to pass to the ducts 115 and in so doing turns the upward flow through 180° with the aid of the baffling 151, there will be a large upward force on the lid 111 which will be transmitted through the neutron shield 122 and pillar 144 to the shield 132. There is thus a need for hold-down of the shield 132, which is provided by beams 154 which extend across the minor width of the vault 102, the design of the beams 154 being simplified by the minimum beam length dimension made possible by the elliptical shape of the tank 101. This requirement for hold-down against coolant forces is however a relatively small one compared with the requirement for hold-down to provide containment against an excursion of explosive violence within the reactor tank. The ability to make the hold-down beams of sufficient strength to provide hold-down against explosive forces is greatly assisted by the said minimum beam length. Although the elliptical shape of tank 101 is of material assistance in hold-down and for convenient distribution of the major components of core, fuel store, heat exchangers and circulating pumps, shapes other than elliptical which have a major and minor width dimension can also be employed. Examples are the rectangular tank having rounded corners provided in the construction hereinbefore described with reference to FIGS. 1 and 2, and an oval tank.

The heat exchanger sections 106 (FIGS. 3 and 5) are disposed with two sections in each vessel 152, each section having its own pump 107. The arrangement is that hot sodium from the core and radial breeder regions is fed into each vessel 152 by a pair of the ducts 115, one duct 115 being associated with each heat exchanger section 106. Each section 106 has an inlet plenum 154 communicating with the upper end of once-through heat exchanger tubes 155 held in upper and lower tube plates 156, 157 respectively. The lower end of the tubes 155 are open to a lower plenum 158 in which are disposed the inlets 159 of the respective pump 107, which is of the dual inlet, radial flow impeller type, the pump outlets 160 communicating with the ducts 117 for return to the core. Secondary sodium, which is in circuit with secondary heat exchangers (not shown) outside the tank 101 and employed for steam raising for electrical power producing turbines, enters each vessel 152 by ducts 161 at the lower end adjacent and above the tube plate 157 of each section 106, and leaves by duct 162 which takes secondary sodium off at the upper end of the chamber 163 formed between the tube plates 156, 157. Thus the primary sodium from the core flows through the tubes 155 whilst the secondary sodium flows countercurrently over the tubes 155.

The pumps 107 are each disposed in a tube 164 extending through each vessel 152 and are accessible for maintenance through shielded manholes 147 in the roof 103. The heat exchanger sections 106 can similarly be reached by shielded manholes 165. The pumps 107 are driven electrically employing station output but provided with stand-by auxiliary motors driven from a guaranteed emergency supply of electricity. They also incorporate flywheels to give a run-down capacity to enable switching-over to emergency supplies to be done with the minimum interference with sodium circulation. Conveniently one outlet duct (not shown) from each pump has a valve and communicates directly with the sodium pool in the vessel 101; this is to give a measure of interchangeability of sodium between the primary circuit, which is entirely enclosed apart from the leakages and scavange flow previously referred to, and the sodium pool. The amount of interchangeability can be regulated by the valve, which is operable remotely.

In a modification, and to allow the sodium pool the better to act as a heat sink for decay heat from the core in the event of failure of one or more sodium pumps, the communication between each enclosed circuit and the pool instead of being constituted as aforesaid may comprise a manually operable valve plus a stand-by valve at the highest part of each coolant loop, and a manually operable valve plus a stand-by valve on the inlet side of each sodium circulation pump.

The space between the roof 103 and the sodium level L' is occupied by an inert gas (e.g. argon) blanket 153 which is kept at slightly less than atmospheric pressure whereby any leakage will be inwardly. Clearances, for example those between shields 132 and 133 and between shield 133 and roof 103 are protected by dip seals and an inert gas purge of the interspace between dip seals with slight overpressure bringing about bubbling of the purge gas inwardly through the lower dip seal.

It will be observed from FIG. 3 that the fuel store 124 is disposed centrally about the minor axis of the tank 101 and adjacent the wall thereof. It will also be noted from FIG. 3 that the axis 166 of the core is offset from the intersection 167 of the major and minor axes of the elliptical tank 101. This means that the core is nearer that part of the wall of the tank 101 than it is to the opposite part of the wall, which latter is adjacent the fuel store. This nearness is advantageous in that nuclear instrumentation can be disposed outside the tank and away from activation by irradiated fuel which is temporarily stored in the fuel store 124. Furthermore, the disposing of the fuel store 124 at one side of the minor diameter means that it is a considerable distance from other major components, particularly pumps, so that activation from stored irradiated fuel is reduced to the minimum.

The enclosed coolant circuitry common to both of the described constructions is advantageous in that there is a single sodium level (L, L') in the tank (1, 101) which is largely undisturbed, thus reducing to negligible proportions the problem of gas entrainment from the blanket. As a result, there is no necessity to provide tank height to allow for changes in sodium level, and therefore the length of components suspended from the shields and vault roof into the sodium can be reduced, which is mechanically advantageous and will effect economies in material. In addition, the single static sodium surface will be at comparatively low temperature, thereby easing thermal stress, sodium vapor problems and reducing thermal insulation requirements. The enclosed circuitry also allows pressure fed heat exchangers to be employed. Furthermore, the presence of the internal neutron shield forming part of the core vessel lid means that the shielding necessary in the shields (32, 33; 132, 133) is reduced compared with earlier designs, which should reduce physical size and expense. Furthermore, reduced activity of the gas blanket should result. The combined lid and neutron shield provide a convenient support structure for items associated with control and instrumentation e.g. the control element parking tubes (38, 138), the coolant sampling pipes (42, 142) and thermocouple cables (43, 143).

I claim:

1. A large power-producing nuclear reactor comprising a liquid metal cooled fast breeder reactor having its coolant circuitry submerged in a liquid metal pool in a tank disposed in a vault, the reactor including, in combination, an enclosure for the core of the reactor and constituted by an open-topped vessel containing the reactor core, radial neutron shield and lower end neutron shield and a lid closing the top of said vessel, a portion of upper end neutron shield incorporated in said lid, a roof of said vault constituting the remaining portion of upper end neutron shield, and a plurality of coolant circuit loops each comprising outflow ducting penetrating said vessel at the upper end region thereof, inflow ducting penetrating said vessel at the lower end thereof, and heat exchange means and liquid metal circulating means in closed circuit relative to the liquid metal pool between said outflow and inflow ducts such that the liquid metal pool is not normally included in the circuit.

2. A nuclear reactor according to claim 1, wherein the said vault roof includes a part which is rotatable relative to the reactor core and is co-axial therewith, and said vessel lid is connected to the co-axial roof part for rotation therewith.

3. A nuclear reactor according to claim 2, wherein said vessel lid includes equipment and instrumentation associated with the reactor core and including control rod mechanism, coolant sample pipes for monitoring for failed fuel elements, and thermocouples for core coolant outflow temperature monitoring.

4. A nuclear reactor according to claim 2, wherein the co-axial roof part and the vessel lid connected thereto are together movable outwardly relative to said reactor core, whereby equipment associated with monitoring of said core and supported by said vessel lid can be withdrawn from said reactor core.

5. A nuclear reactor according to claim 1, including at least one manually operable valve for joining each coolant circuit loop to the liquid metal pool for providing a heat sink for decay heat from the reactor core in the event of failure of coolant circulating means.

6. A nuclear reactor according to claim 1, wherein said tank has a relatively minimum width in the region thereof wherein the reactor core is disposed, a hold-down structure for said core lid and vault roof being provided spanning the tank at its point of minimum width.

* * * * *